Patented Jan. 27, 1942

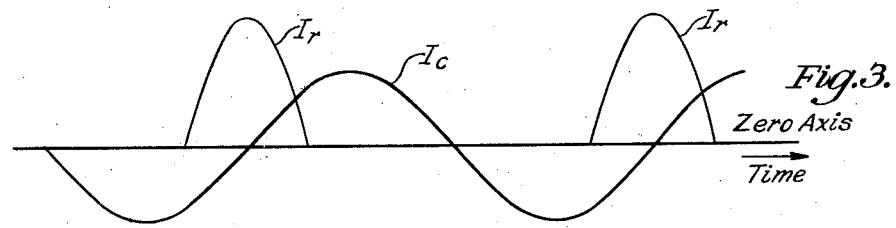
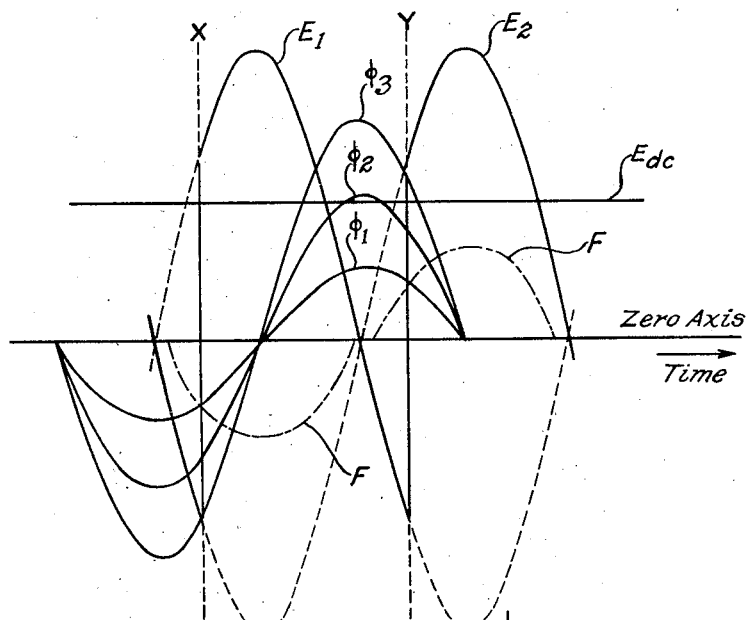
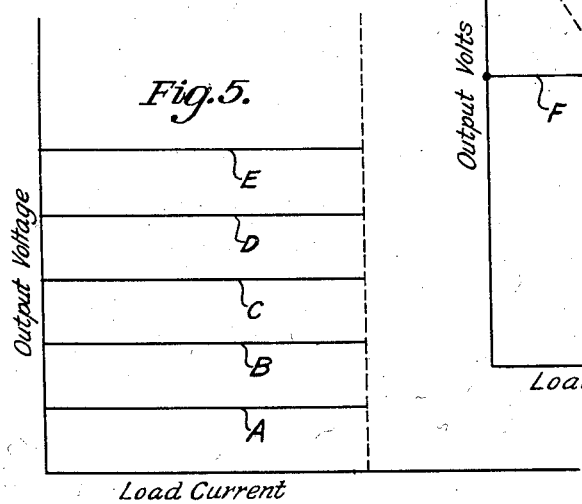
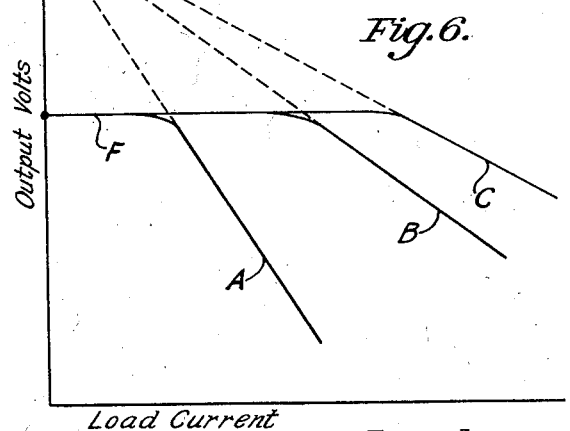

2,270,894

UNITED STATES PATENT OFFICE 2,270,894

CONTROLLED RECTIFIER AND BATTERY CHARGER

Wilcox P. Overbeck, Waltham, Mass., assignor to Raytheon Manufacturing Company, Newton, Mass., a corporation of Delaware Application January 29, 1938, Serial No. 187,673

12 Claims. (Cl. 175—363)

This invention relates to controlled rectifiers which may be used for a variety of purposes, including the charging of batteries.

One of the objects of my invention is to devise a system for controlling electrical space discharge rectifiers so that the output thereof is maintained at a constant value throughout the entire load range of said rectifiers.

Another object is to provide such a system in which the value of the voltage so maintained may be selected and varied at will.

A further object is to devise such a system which is very stable in operation.

A still further object is to provide such a controlled rectifier system which automatically charges a battery and varies its charging rate in a desired manner as the charge of said battery and the load thereon changes.

An additional object is to accomplish all of the above by the use of magnetically-controlled gaseous discharge rectifiers.

The foregoing and other objects of my invention will be best understood from the following description of exemplifications thereof, reference being had to the accompanying drawings, wherein:

Fig. 3 represents the varying currents flowing through different parts of my control circuit;

Fig. 4 represents various voltages and fluxes flowing in my novel system;

Fig. 5 shows a series of curves representing the characteristics of the system as illustrated in Fig. 1; and Fig. 6 shows a series of curves representing the characteristics of the arrangement as illustrated in Fig. 2.

Figure 1:
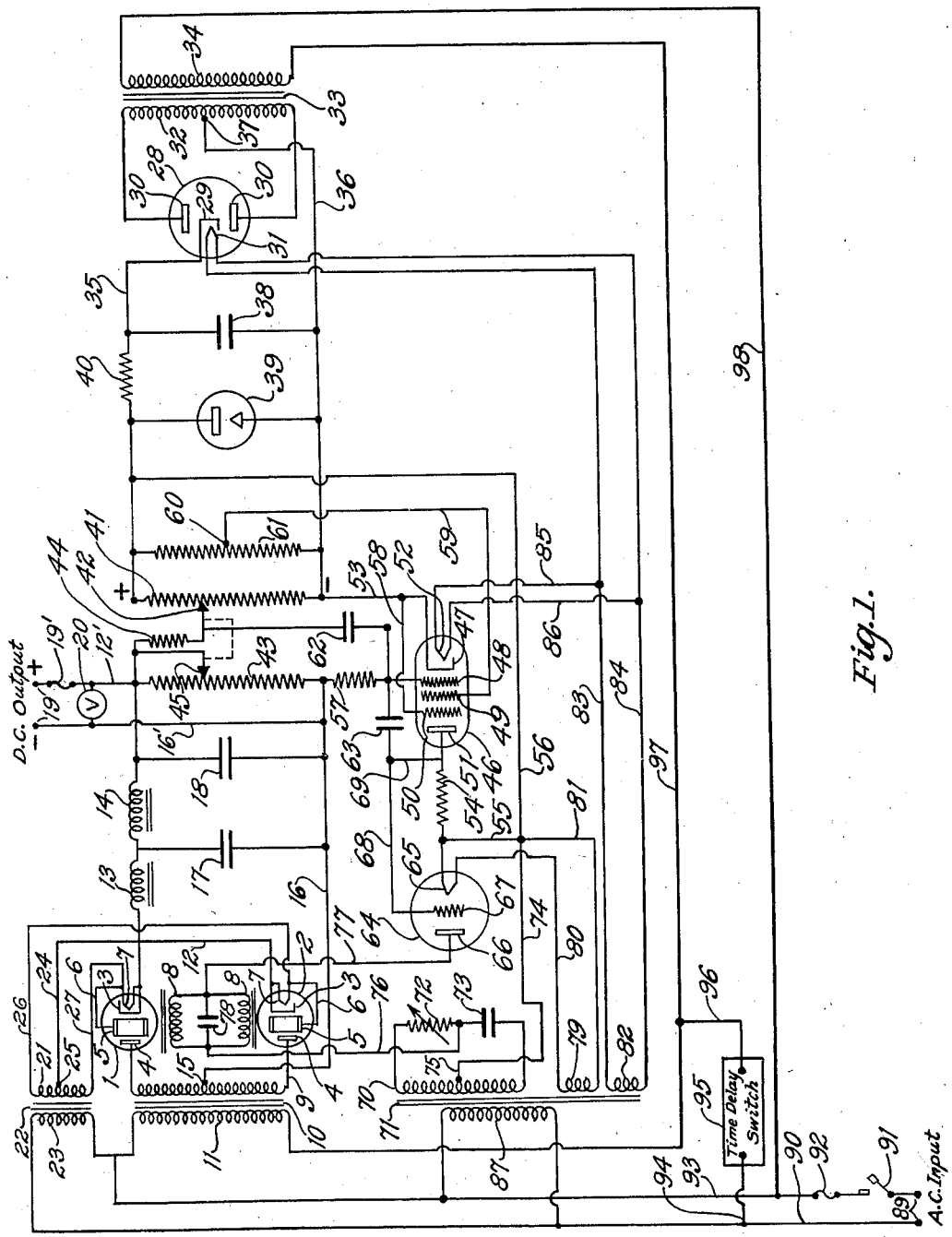
Fig. 1 is a circuit diagram illustrating one embodiment of my invention.

In Fig. 1 there is represented a single-phase full-wave rectifying system comprising two rectifier tubes 1 and 2. These tubes are preferably of the magnetically-controlled type as more fully described in the patent to Percy L. Spencer, No. 2,124,682, dated July 26, 1938, for an improvement in Electrical gaseous discharge devices. Each tube is provided with an indirectly-heated cathode 3 of the type which may be heated to temperature of thermionic emission during operation, and an anode 4. Intermediate each cathode 3 and anode 4 is interposed an auxiliary electrode 5 which may consist of an electrically-conducting cylinder, either perforate or imperforate. Instead of completely surrounding the discharge space, the auxiliary electrode 5 may partially surround it. Each tube is filled with a suitable ionizing gas or vapor, preferably argon, with a pressure of the order of one millimeter or less. In any event, the gas pressure is of a suitable value so that when a discharge occurs between the cathode and anode, the gas or vapor becomes ionized and current flows at a relatively low voltage drop. Each cathode 3 is provided with a heating filament 7, one end of which is directly connected to its associated cathode. Each auxiliary electrode 5 is connected by means of a conductor 6 to the opposite end of its associated heating filament 7. The intermediate electrode 5 may be connected in any other desired manner, for example directly to the cathode 3, and a suitable bias voltage may be impressed upon each auxiliary electrode 5, if desired. In order to control the starting of the current between each cathode 3 and anode 4, a control winding 8 wound upon the magnetic core is disposed externally to the rectifier tubes 1 and 2. The magnetic core is constructed as described in the Spencer patent referred to above so as to impress a magnetic field transverse to the discharge path between each cathode and anode within the auxiliary electrode 5. In the interest of simplicity the transverse relationship is not illustrated in the drawings, but the winding 8 and its associated core are indicated in a purely diagrammatic manner.

In order to supply the rectifier tubes 1 and 2 with power, the anodes 4 are connected to the opposite ends of a secondary winding 9 of a transformer 10 which has a primary winding 11. The two cathodes 3 are connected together by means of a conductor 12 which thus constitutes the positive terminal of the output of the rectifiers 1 and 2. A tap 15 intermediate the ends of the secondary winding 9, preferably at the center point thereof, constitutes the negative terminal of the output of the rectifier tubes 1 and 2. A conductor 16 is connected to said center tap 15. In order to remove the ripples from the rectified output of the tubes 1 and 2, a filter consisting of filter chokes 13 and 14 in series from the positive terminal lead 12 and filter condensers 17 and 18 connected from opposite sides of the filter choke 14 to the negative conductor 16 are provided. A conductor 12' extends from the outer end of the choke 14 and a conductor 16' extends from the negative lead 16. The two conductors 12' and 16' extend to the terminals 19 which constitute the direct current output terminals of the controlled rectifier system. In order that the direct current output voltage may be readily observed, an output voltmeter 20 is connected between the conductors 12' and 16'. A fuse 19' may be interposed in the lead 12'.

In order to supply the heating filament 7 with heating current, there is provided a transformer 22 having a secondary 21 and a primary 23. The secondary 21 is provided with a center tap 25 from which a conductor 24 extends to the common cathode lead 12, and thus to one side of each of the filaments 7. A conductor 26 extends from one end of the secondary 21 to the outer end of one of the filaments 7, and a conductor 27 extends from the other end of the secondary 21 to the outer end of the other heating filament 7. Due to the heating circuit arrangement as described, a balanced heating current flows in the two filaments 7 and the voltage conditions on each of the controlled rectifier tubes 1 and 2 are symmetrical.

In order that the output voltage from the rectifier system described above be maintained at a constant value with substantially no deviation therefrom, I provide a constant reference voltage against which the output voltage of the rectifier system is balanced. The constant reference voltage may be obtained from a full-wave rectifying system comprising a rectifier tube 28. This tube contains an indirectly-heated thermionic cathode 29 and two anodes 30. The cathode 29 is raised to temperature of thermionic emission by means of a suitable heating filament 31. The rectifier tube 28 is supplied with power from the secondary winding 32 of a transformer 33 which has a primary winding 34. The two anodes 30 are connected to the outer ends of the secondary winding 32. A conductor 35 is connected to the cathode 29 and serves as the positive reference voltage lead. The secondary 32 is provided with an intermediate center tap 37 to which is connected a conductor 36 which forms the negative reference voltage supply lead. A smoothing condenser 38 is connected directly across the two leads 35 and 36, and eliminates to a substantial degree the ripples from the rectified current output of the rectifier 28. In order to maintain the reference voltage constant within very narrow limits, a glow discharge voltage regulating tube 39 is likewise connected between the two conductors 35 and 36. The tube 39 is of the type which contains relatively extended electrodes which remain cold throughout its operation and which is filled with an ionizable inert gas. In such a tube current is conducted between the electrodes by the glow discharge phenomenon which has the property of maintaining between the electrodes a very constant voltage for all values of current flowing through said tube below a predetermined maximum. In order to absorb variations in voltage which may occur at the output terminals of the rectifier tube 28, a resistance 40 is connected in the positive supply lead 35 ahead of the voltage regulating tube 39. Across the terminals of the voltage regulating tube 39 which maintains a constant reference voltage as described above, is connected a potentiometer 41. The potentiometer 41 is provided with a movable contact 42, whereby any desired part of the total reference voltage may be selected.

It will be noted that the controlled rectifying system is of the type having an input choke 13 to the filter. The total input inductance to the filter is always greater than the critical value at which current flows through each rectifier tube 1 and 2 for a complete half cycle after a discharge has been initiated therein. A potentiometer resistance 43 is likewise connected across the output of the controlled rectifier system comprising the rectifier tubes 1 and 2. This resistance 43 prevents the total resistance connected to the output of the rectifier tubes 1 and 2 from exceeding a predetermined value. The critical inductance and its relation to the output resistance of such a controlled rectifier system as I have described are more fully described and claimed in my copending application, Serial No. 186,372, filed January 22, 1938, for an improvement in Filter systems for controlled rectifiers.

In order to tie the controlled rectifier system to the reference voltage system, a resistance 44 is connected from the contact 42 on the potentiometer 41 to the upper end of the resistance 43. Since very little, if any, current flows through the resistance 44, it may be of a comparatively high value. It is desirable that the current through the resistance 43 shall be maintained at a substantially constant value. In order to accomplish this, an adjustable contact 45 is provided on the resistance 43, and is connected to the upper end thereof. Likewise the contact 45 is tied physically to the contact 42 so that they both move together. This relationship is indicated diagrammatically by the dotted line connecting the two contacts 45 and 42. In this way, as the contact 42 is adjusted to provide for a lower output voltage, the contact 45 decreases the resistance 43 so that the resultant current flowing through the resistance 43 remains substantially constant.

As pointed out in my copending application referred to above, $\omega L_c/R$ increases as the delay in the firing of the rectifiers increases. The symbol $\omega$ represents $2\pi$ times the frequency of the A. C. power line, $L_c$ represents the critical inductance to which I have referred, and R represents the value of the resistance connected across the output circuit. Since the load connected to the terminals 19 may at some time be disconnected, R may be considered the resistance of 43 for purposes of determining the value of the critical inductance $L_c$. As the direct current output voltage across the terminals 19 is decreased by adjustment of the contact 42, as pointed out below, the time of firing of the tubes 1 and 2 will be delayed. If the resistance 43 were permitted to remain the same under all conditions, it would then be necessary to have a greater value of critical inductance at lower values of output voltage. However, by the adjustment of the contact 45 with the contact 42 as described above, the resistance 43 is decreased as the output voltage is decreased, and thus the necessary value of the critical inductance remains substantially the same for all values of output voltage. Furthermore, by this arrangement, a comparatively high value of resistance 43 may be used at the higher output voltages, thus preventing any excess loss of power in said resistance 43.

If during operation the voltage across the output of the controlled rectifiers 1 and 2, namely the voltage which appears across the resistance 43, differs from the voltage appearing between the contact 42 and the negative reference voltage supply lead 36, this difference in voltage will appear between said negative lead 36 of the reference voltage system and the negative lead 16 of the controlled rectifier system. This voltage difference is then utilized to vary the voltage output of the controlled rectifiers 1 and 2 so as to bring said output voltage into substantial balance with the voltage appearing between the contact 42 and the negative supply lead 36 of the reference voltage system. Thus, by adjusting the contact 42, the voltage at which the output from the controlled rectifiers 1 and 2 is maintained may readily be selected.

The voltage difference between the two systems as described above is amplified before it is utilized to control the rectifiers 1 and 2. For this purpose a voltage-amplifying tube 46 is provided. This tube is preferably of the pentode type having an indirectly-heated thermionic cathode 47, a control grid 48, a screen grid 49, a suppressor grid 50, and an anode 51. The cathode 47 may be heated to temperature of thermionic emission by a suitable filamentary heater 52. The output voltage from the rectifier 28 is utilized to supply power to the amplifier tube 46. For this purpose a conductor 53 extends from the negative terminal of the potentiometer 41 to the cathode 47, and the anode 51 is connected through the resistance 54 and conductors 55 and 56 to the positive terminal of the potentiometer 41. The control voltage difference is impressed upon the control grid 48 by having the negative terminal of the resistance 43 connected through a resistance 57 to said control grid. As is customary in tubes of the pentode type, the suppressor grid 50 is connected back to the cathode 47 by means of a conductor 58. In order to provide the screen grid 49 with suitable intermediate potential, a resistance 61 is connected across the reference voltage supply system, and a conductor 59 connects the screen grid 49 to an intermediate tap 60 on said resistance 61. When the voltage on the control grid 48 varies, the current in the anode circuit likewise varies, and an amplified voltage drop appears across the anode resistance 54. In order to make the system stable and prevent hunting, the response of the amplifier tube 46 to variations in the control voltage is delayed. This is accomplished by connecting a condenser 62 between the contact 42 and the control grid 48. Additional delay producing a degenerating effect in the amplifier tube 46 is accomplished by means of a condenser 63 connected between the control grid 48 and the anode 51. The condensers 62 and 63 are of such a value that the delay in the response of the amplifier tube 46 is of the same order of magnitude as the delay in the change of the output voltage upon the supplying of controlling currents to the regulating coils 8. Preferably the delay in the amplifier tube 46 is somewhat greater than said delay in the controlled rectifier tube system.

In order to supply the tube-controlling coils 8 with power, a vacuum tube rectifier 64 controlled from the amplified voltage appearing across the resistance 54 is used. The rectifier 64 is provided with a filamentary thermionic cathode 65, an anode 66, and a control grid 67. The cathode 65 is connected directly to the outer end of the resistance 54, and the grid 67 is connected by means of the conductors 68 and 69 to the other end of the resistance 54. In this way the amplified control voltage is impressed upon said grid.

In order to supply the rectifier tube 64 with power, a transformer 71 having a secondary winding 70 is provided. A phase-shift network consisting of a resistance 72 in series with a condenser 73 is connected across the secondary winding 70. The resistance 72 and the condenser 73 may be made adjustable, but in the interest of simplicity, the resistance 72 itself is designed so that some adjustment may be had therein. The secondary winding 70 is provided with a center tap 75 from which a conductor 74 extends to the conductors 55, and thus to the cathode 65. A conductor 76 extends from the point intermediate the resistance 72 and the condenser 73 to one side of the two control coils 8 connected in parallel. A conductor 77 extends from the other side of said coils 8 to the anode 66. A condenser 78 is connected in parallel with the two control coils 8, and is preferably of such a value as to make the circuit of said control coils resonant at the supply voltage frequency.

In order to supply the filament 65 with heating current, the transformer 71 has an auxilary secondary winding 79. One end of said secondary is connected by means of a conductor 80 to one end of the filament 65. The other end of said secondary 79 is connected by means of the conductors 81 and 55 to the other side of said filament 65.

In order to supply the heating filaments 52 and 31 with current, an additional secondary winding 82 is also provided on the transformer 71. The opposite ends of said secondary 82 are connected by means of the conductors 83 and 84 to the opposite ends of said heating filament 31. Two conductors 85 and 86 connect the opposite ends of the filament 52 to the conductors 83 and 84, respectively, thus supplying said filament with current from the secondary 82. The transformer 71 is energized by means of a primary winding 87.

The entire system is supplied with power from a pair of alternating current input terminals 89. To one of these terminals is connected an alternating current line conductor 90; the other input terminal is connected through a main switch 91 and a fuse 92 to the other alternating current line conductor 93. The primary windings 23 and 87 are connected directly across the conductors 90 and 93. Thus when the switch 91 is closed, all of the filaments are supplied with heating current. It is desirable that the application of the anode voltages in the respective tubes should be delayed until the cathodes have been heated to their operating temperature. For this purpose the time delay switch 95 is provided. A conductor 94 extends from the line conductor 90 to the time switch 95, the other side of which is connected to a conductor 96 extending to an additional conductor 97. The conductor 97 is connected to one end of the primary winding 11 and also to one end of the primary winding 34. The other end of the primary winding 11 is connected directly to the line conductor 93, and the other end of the primary winding 34 is also connected by means of the conductor 98 to the line conductor 93. When the switch 91 is first closed, the time delay switch 95 is open and does not close until a predetermined interval of time during which the respective cathodes have been raised to their operating temperature. After said interval of time, the time delay switch 95 operates to connect the conductors 94 and 96, thus energizing the primary windings 11 and 34 which supply power to the anodes of the respective tubes of the system.

The constants of the system described above are so selected that the control grid 67 of the rectifier tube 64 normally has impressed upon it a negative voltage which permits the tube 64 to conduct pulses of current only at the positive peak of the voltage impressed upon the anode 66. Under these conditions, as shown in Fig. 3, pulses of current $I_r$ will flow through the output circuit of the rectifier circuit 64. These pulses of current are supplied through the conductor 77 to the control coils 8 connected in parallel with the resonating condenser 78. When said parallel circuit is energized by the pulses of current $I_r$, an alternating sine wave current will flow in said parallel circuit. Under these conditions, a current $I_c$ will flow through each control coil 8. Since each control coil 8 may be considered as a pure inductance, the current $I_c$ will lag the current impulses $I_r$ by 90 degrees, as indicated in Fig. 3. As indicated in Fig. 4, two voltages $E_1$ and $E_2$ 180 degrees out of phase with each other, are impressed upon the tubes 1 and 2 respectively. The transverse magnetic flux set up by the coil 8 associated with each controlled rectifier prevents the starting of current whenever the anode of such tube is positive until said flux has fallen below a predetermined minimum value. This minimum value varies somewhat with the voltage on the anode. The curve F in Fig. 4 represents a possible flux characteristic curve for such tubes. Whenever the flux is less than the value indicated by the curve F, the tube will start to conduct current. Since the flux through each coil 8 is in phase with the current flowing through said coil, when the current $I_c$ flows through each coil 8, a flux $\phi_1$, as indicated in Fig. 4, will be set up across the discharge path of each rectifier tube 1 and 2. The flux $\phi_1$ drops below the curve F at the point X during the time when $E_1$ is positive. Thus the tube 1 starts to conduct current at that point, and the conduction of current continues until the flux $\phi_1$ intersects the curve F at the point Y during the time that the voltage $E_2$ is positive. At the point Y, therefore, the tube 2 will start to conduct current and the tube 1 will cease its conduction of current. It will be noted that, as indicated in Fig. 4, each tube conducts current for a full half cycle. This occurs when the input choke 13 has an inductance greater than the critical value as described and claimed in my copending application referred to above. Under the conditions described, a voltage as represented by the solid line $E_1 E_2$ appears between the conductors 12 and 16. The non-conducting portions of the two voltage waves $E_2$ and $E_1$ are represented by the dotted lines. The filter consisting of the coils 13 and 14 and the condenser 17 and 18 smooths out the voltage wave appearing between the conductors 12 and 16 resulting in an average value of voltage represented by the line $E_{dc}$.

If the voltage across the resistance 43 tends to rise above the reference voltage on the potentiometer 41, the grid 48 of the tube 46 tends to become more negative, thus decreasing the current flow through the resistance 54 and making the grid 67 of the tube 64 less negative with respect to its cathode. Under these conditions, the pulses of current $I_r$ supplied by the tube 64 increase in magnitude, and thus cause currents of increasing amplitude to flow through the coils 8. Thus as the voltage output across the resistance 43 increases, increasing values of flux $\phi_1$, $\phi_2$ and $\phi_3$, as indicated in Fig. 4, may be set up in the respective tubes 1 and 2. Since these curves of flux intersect the curve F at increasingly delayed points along the voltage waves $E_1$ and $E_2$, conduction will occur at increasingly delayed points on said voltage waves. As the initiation of conduction is delayed on the voltage waves $E_1$ and $E_2$, the resultant D. C. voltage will become less. Thus any increase in the voltage across the resistance 43 sets the system in operation to decrease the voltage output from the tubes 1 and 2, and thus decreases the voltage across the resistance 43. It will be understood that if the voltage across the resistance 43 tends to become less than the selected portion of the reference voltage, the system will work in the opposite direction from that described above, and will tend to raise the voltage across the resistance 43 until it again equals the selected portion of the reference voltage. From the foregoing it will be seen that the system operates so as to maintain the voltage across the resistance 43 substantially equal to whatever portion of the reference voltage across the potentiometer 41 is selected by the adjustable tap 42.

In Fig. 5 are given typical characteristic curves of a system such as I have described above. By providing the potentiometer 41 with a number of definitely located taps, the characteristic curves A, B, C, D and E may be obtained. It will be noted that each of these curves gives a constant output voltage for variations in load. This is due to the fact that the system described maintains the output voltage of the controlled rectifier system equal to the reference voltage no matter what type of variation, whether due to load or otherwise, is introduced into the system.

Figure 2:
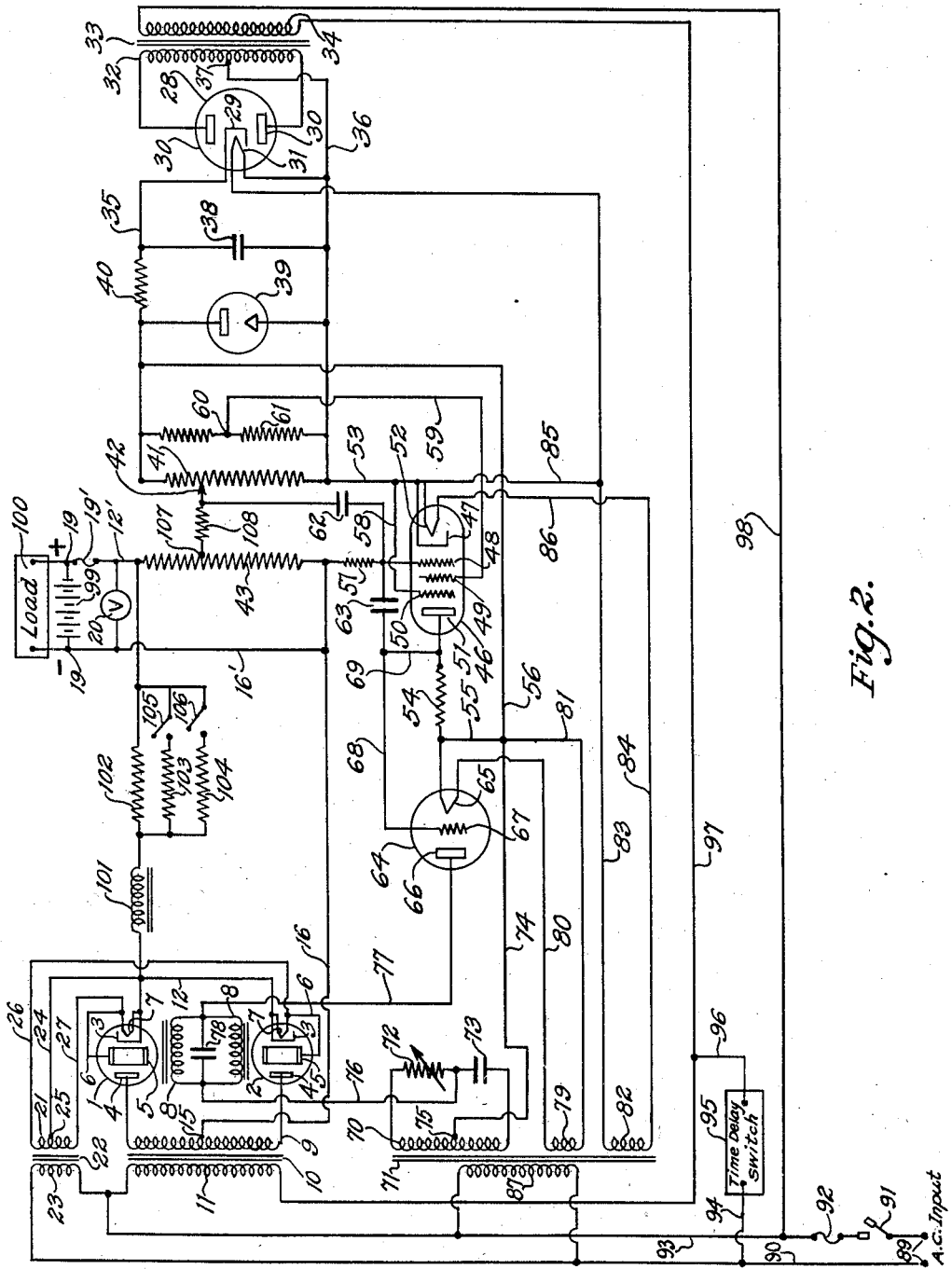
Fig. 2 is a circuit diagram embodying my invention in an automatic battery-charging system.

My invention is also readily applicable to automatic battery charging systems, and may be applied thereto, for example, as shown in Fig. 2. In Fig. 2, where the arrangements as shown in Fig. 1 are identical, the same reference numerals are applied to the various parts as in Fig. 1. The system as shown in Fig. 2 differs from Fig. 1 only in the output circuit of the controlled rectifiers 1 and 2. In Fig. 2 a battery 99 is connected directly across the output terminals 19. Also a load 100 connected across said terminals 19 is also indicated. Since the battery 99 in Fig. 2 serves in itself as a filter element and tends to remove ripples from the output voltage, the filter system as shown in Fig. 1 is eliminated. In Fig. 2, however, a choke 101 is connected in series with the output from the positive terminal conductor 12. The choke 101 is of such a value as to exceed the critical inductance value as discussed above in connection with the choke 13. Also in series with the choke 101 are a plurality of parallel resistances 102, 103 and 104. The resistances 103 and 104 are provided with switches 105 and 106 so that they may be selectively connected into the circuit. In this way the amount of resistance connected in series with the load and battery in the output of the controlled rectifiers 1 and 2 may be adjusted. The voltage regulating glow discharge tube 39, which is preferably used in such systems, may have a voltage drop of the order of 90 volts. The battery 99, however, may have a voltage of 120 volts when fully charged. Therefore, instead of comparing the entire voltage of the battery with the reference voltage, a portion of said voltage may be selected by means of a tap 107 on the resistance 43. In this way, any predetermined part of the battery voltage is compared with the selected portion of the reference voltage. A resistance 108 analogous to the resistance 44 of Fig. 1 connects the tap 107 to the tap 42 in Fig. 2.

In the system described above, the tap 42 is adjusted along the potentiometer 41 until a voltage is selected which is the voltage at which the battery 99 should be maintained. With the load set at substantially its zero value, very little current is drawn from the system. Under these conditions the system operates to maintain the voltage of the charging system at the desired battery voltage, whereupon the proper trickle charge rate is supplied to the battery 99 to maintain it at said voltage. In the characteristic curves as shown in Fig. 6, the system under these conditions will operate on the horizontal line F very close to the vertical axis. If we assume that the switches 105 and 106 are in their open position and the load 100 is adjusted so as to draw increasing values of current, such increased currents will flow through the resistance 102 and tend to lower the voltage supplied from the rectifiers 1 and 2 to the battery 99. However, the regulating system will operate to maintain the output voltage at the requisite value, and under these conditions substantially all of the current supplied to the load will be drawn from the rectifiers 1 and 2. However, as the load current increases, the control system will cause the rectifiers 1 and 2 to fire earlier in the conducting cycle until the tubes 1 and 2 reach a condition in which conduction starts whenever the anode 4 becomes positive. This condition represents the maximum voltage output which can be supplied by the rectifiers 1 and 2, and beyond that point no additional regulation can be secured. If the load further increases, the voltage output from the controlled rectifiers will tend to drop along the line A of Fig. 6. Under these conditions, the excess current is no longer supplied by the controlled rectifiers 1 and 2, but is furnished to the load from the battery 99. However, the controlled rectifiers 1 and 2 still continue to supply their maximum current rating. If the load is again decreased beyond the excess value, the battery no longer supplies current but floats across the output, and is automatically maintained in its fully charged condition.

If it is desired to increase the maximum current which the controlled rectifiers will supply to the load, the switch 105 may be closed, which then decreases the resistance in series with the output from the rectifiers. Under these conditions, a greater value of load current must be drawn from the rectifiers in order to produce a voltage drop which will bring the regulation of the rectifiers to its maximum value. Under these conditions the load current drawn from the controlled rectifiers will continue along the line F in Fig. 6 until the curve B is reached, at which point the controlled rectifiers 1 and 2 will refuse to supply any more current to the load, and the excess will be furnished by the battery. Likewise, closing the switch 106 will enable the controlled rectifiers 1 and 2 to supply current up to the point where the drooping characteristic C occurs. The dotted line continuations of curves A, B and C represent the type of characteristic which a rectifier would have if it were not provided with automatic regulation. The slope of each of the curves A, B and C depend upon the total value of resistance in series with the output of the controlled rectifiers. As the amount of resistance is decreased, the slope of the curve will decrease, thus permitting larger values of output current from the controlled rectifiers as described above.

The automatic battery charging system described above furnishes to the load 100 very good dynamic regulation so that the voltage at the load is maintained at constant value for wide variations in load requirements. Furthermore, the arrangement greatly increases the life of the battery because the battery is called upon only to supply excess load requirements and at other times is automatically maintained on a trickle charge to keep the battery at its fully charged condition.

Of course it is to be understood that this invention is not limited to the particular details as described above inasmuch as many equivalents will suggest themselves to those skilled in the art. For example, certain aspects of my invention might be utilized with any type of controlled rectifier tube in which the discharge may be initiated at any desired portion of the positive voltage wave applied to the anode, whereupon conduction will continue as described in connection with this invention. Such controlled rectifier might be of the grid-controlled type or of some other magnetically-controlled type. Also other types of reference voltage systems may be utilized. These and other equivalents will present themselves, and therefore it is desired that the appended claims be given a broad interpretation commensurate with the scope of the invention within the art.

What is claimed is:

1. A rectifier system comprising an alternating current supply circuit, a direct current output circuit, a rectifier interposed between said circuits, a control circuit, control means for controlling the output of said rectifier in response to current flowing in said control circuit, and means for supplying discontinuous current pulses to said control circuit at the frequency of said alternating current source, said control circuit comprising an inductance and a capacity in parallel of a value whereby a substantially sine wave alternating current of the frequency of said alternating current source flows in said control circuit when said current pulses are supplied to said control circuit.

2. A rectifier system comprising an alternating current supply circuit, a direct current output circuit, a rectifier interposed between said circuits, a control circuit, control means for delaying the firing of said rectifier in response to current flowing in said control circuit, and means for supplying discontinuous current pulses to said control circuit at the frequency of said alternating current source, said control circuit comprising an inductance and a capacity in parallel of a value whereby a substantially sine wave alternating current of the frequency of said alternating current source flows in said control circuit when said current pulses are supplied to said control circuit.

3. A rectifier system comprising an alternating current supply circuit, a direct current output circuit, a rectifier interposed between said circuits, a control circuit, electromagnetic control means for delaying the firing of said rectifier in response to current flowing in said control circuit, and means for supplying discontinuous current pulses to said control circuit at the frequency of said alternating current source, said control circuit comprising an inductive energizing winding for said control means and a capacity in parallel, whereby an alternating current of the frequency of said alternating current source flows in said control circuit when said current pulses are supplied to said control circuit.

4. A rectifier system comprising an alternating current supply circuit, a direct current output circuit, a rectifier interposed between said circuits, a control circuit, control means for controlling the output of said rectifier in response to current flowing in said control circuit, means for supplying discontinuous current pulses to said control circuit at the frequency of said alternating current source, said control circuit comprising an inductance and a capacity in parallel of a value whereby a substantially since wave alternating current of the frequency of said alternating current source flows in said control circuit when said current pulses are supplied to said control circuit, and means for varying the amplitude of said current pulses in accordance with a desired controlling variation, whereby the amplitude of the current flowing in said control circuit is varied.

5. A rectifier system comprising an alternating current supply circuit, a direct current output circuit, a rectifier interposed between said circuits, a control circuit, control means for controlling the output of said rectifier in response to current flowing in said control circuit, means for supplying discontinuous current pulses to said control circuit at the frequency of said alternating current source, said control circuit comprising an inductance and a capacity in parallel, whereby an alternating current of the frequency of said alternating current source flows in said control circuit when said current pulses are supplied to said control circuit, a reference direct current voltage supply associated with the output of said rectifier, means responsive to the difference between the output voltage of said rectifier system and said reference voltage, and means for controlling the amplitule of said current pulses in accordance with said difference.

6. A rectifier system comprising an alternating current supply circuit, a direct current output circuit, a rectifier interposed between said circuits, a control circuit, control means for controlling the output of said rectifier in response to current flowing in said control circuit, a reference direct current voltage supply associated with the output of said rectifier, means responsive to the difference between the output voltage of said rectifier system and said reference voltage for supplying a controlling current to said control circuit, and means for delaying the response of said last-named means to substantially the same degree as the change in output voltage is delayed upon the supplying of a controlling current to said control circuit or to a greater degree.

7. A rectifier system comprising an alternating current supply circuit, a direct current output circuit, a rectifier interposed between said circuits, a control circuit, control means for controlling the output of said rectifier in response to current flowing in said control circuit, a reference direct current voltage supply associated with the output of said rectifier, an amplifier for amplifying said difference in voltage, means responsive to said amplified voltage for supplying a controlling current to said control circuit, and means for delaying the response of said amplifier to substantially the same degree as the change in output voltage is delayed upon the supplying of a controlling current to said control circuit or to a greater degree.

8. A rectifier system comprising an alternating current supply circuit, a direct current output circuit, a rectifier interposed between said circuits, a control circuit, electromagnetic control means for delaying the firing of said rectifier in response to current flowing in said control circuit, a control rectifier for supplying discontinuous current pulses to said control circuit at the frequency of said alternating current source, means for supplying an alternating voltage of the supply source frequency to said control rectifier, means for shifting the phase between said supply circuit voltage and the voltage supplied to said control rectifier, said control circuit comprising an inductive energizing winding for said control means and a capacity in parallel, whereby an alternating current of the frequency of said alternating current source flows in said control circuit when said current pulses are supplied to said control circuit, and means for controlling said control rectifier to vary the amplitude of said current pulses in accordance with a desired controlling variation.

9. A rectifier system comprising an alternating current supply circuit, a direct current output circuit, a rectifier interposed between said circuits, said rectifier comprising a plurality of rectifying phases, control means for delaying the firing of each of said rectifier phases, an input inductance interposed in series between said rectifier and said output circuit, a resistance connected across said output circuit, means for varying the time of delay of firing of said rectifier phases for varying the output voltage, and means for varying said resistance so that it decreases with an increase in the time of delay of said firing, said inductance being of the critical value or greater at which conduction occurs through each rectifier tube after firing until the adjacent rectifier tube fires.

10. A rectifier system comprising an alternating current supply circuit, a direct current output circuit, a rectifier interposed between said circuits, a control circuit, control means for controlling the output of said rectifier in response to current flowing in said control circuit, means for supplying discontinuous current pulses to said control circuit at the frequency of said alternating current source, said control circuit comprising an inductance and a capacity in parallel, said parallel circuit being tuned to the frequency of said alternating current source.

11. A rectifier system comprising an alternating current supply circuit, a direct current output circuit, a rectifier interposed between said circuits, a control circuit, means for supplying discontinuous current pulses to said control circuit at the frequency of said alternating current source, a reference direct current voltage supply associated with the output of said rectifier, and means responsive to the difference between the output voltage of said rectifier system and reference voltage for supplying a controlling current to said control circuit to reduce said difference.

12. A system comprising a voltage-supplying device, control means for controlling the output voltage of said device, a reference voltage, means responsive to the difference between said output voltage and said reference voltage for supplying a controlling influence to said control means, and means for delaying the response of said last-named means to substantially the same degree as the change in output voltage is delayed upon the supplying of a controlling influence to said control means or to a greater degree.

WILCOX P. OVERBECK.